Dec. 6, 1949          G. WISEN          2,490,498
FLY KILLER
Filed Nov. 17, 1945
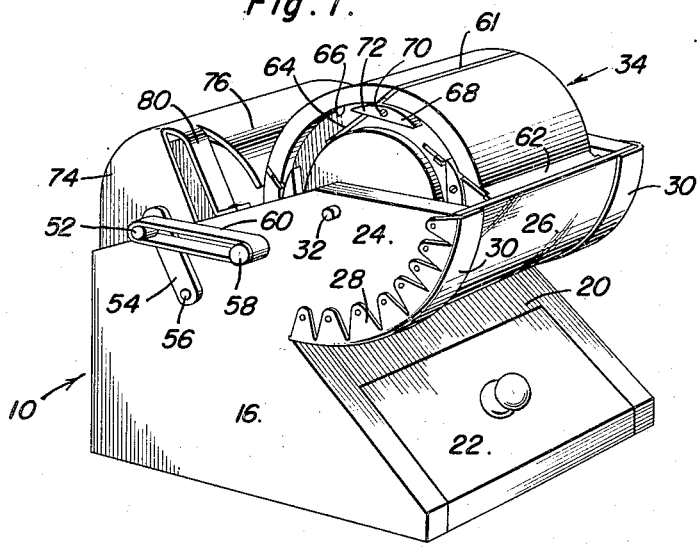
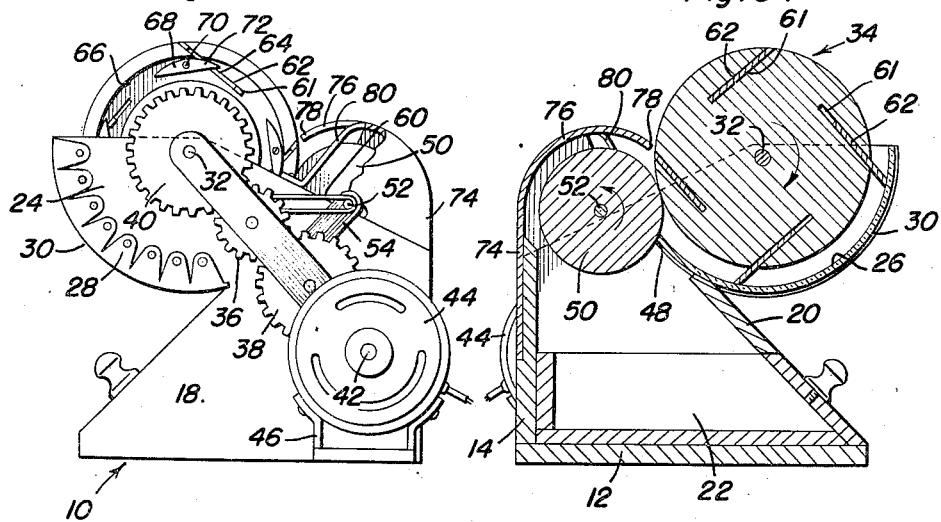
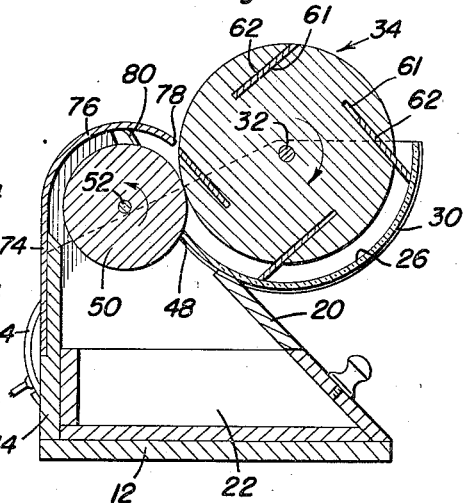
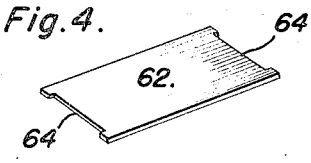
Inventor
Gust Wisen
By *Clarence A. O'Brien*
*and Harvey B. Jacobson*
Attorneys Patented Dec. 6, 1949

2,490,498

UNITED STATES PATENT OFFICE 2,490,498

FLY KILLER

Gust Wisen, Saltsburg, Pa., assignor of fifty per cent to Fred Wisen, Clarksburg, Pa.

Application November 17, 1945, Serial No. 629,233

6 Claims. (Cl. 43—111)

My invention as described herein, and illustrated in the accompanying drawings, consists of a fly killer, an object of which is to provide a baited means for attracting flies, a trap connected therewith, means for killing the trapped flies and depositing them into a receptacle.

Another object of my invention is to provide a revolving drum adapted to carry flies into a trap and then crush them.

A further object of this invention is to provide a spring actuated revolving drum and a roller held there-against for crushing flies cornered on the drum and for depositing the dead flies into a receptacle.

Other features and advantages will become more readily apparent from the following description and the accompanying illustrative drawings in which:

Figure 1 is a perspective view of the present fly trap;

Figure 2 is a side elevational view of Figure 1;

Figure 3 is a vertical of Figure 1; and

Figure 4 is a perspective view of one of the trap plates used in conjunction with the present invention.

Referring now to the drawings in detail, wherein for the purpose of illustration, there is disclosed a preferred embodiment of the present invention, the numeral 10 represents a box-like container or support having a bottom wall 12, a rear wall 14, side walls 16 and 18, and an upwardly and rearwardly inclined forward wall 20. The forward wall 20 is provided with an opening that slidably receives a drawer 22 resting upon the inner face of the bottom wall 12.

The side walls 16 and 18 are provided with forwardly projecting extensions 24 having convexed forward edges that bear against the inner concaved surface of a concavo-convexed glass section or window 26. Retaining brackets 28 secured to the outer faces of the extensions 24 are provided with flanges 30 that rest against the convexed surface of the window 26 to hold the latter against the convexed edges of the extensions 24.

The extensions 24 are provided with registering, substantially horizontal apertures that journally receive the ends of a supporting shaft 32. The shaft 32 is suitably keyed in an axial bore provided in a drum 34 and the outer periphery of the drum 34 is spaced from the concaved surface of the window 26 as shown in Figure 3 of the drawings.

A train of reduction gears 36 and 38 are disposed adjacent the side wall 16 and the gear 36 engages a relatively large gear 40 secured to the shaft 32. The gear 38 is driven by a suitable gear (not shown) mounted on the drive shaft 42 of a motor 44. The motor 44 is supported relative to the side wall 16 by a motor mounting or bracket 46 carried by the side wall 16.

The window 26 extends substantially half way around the lower part of the drum 34 and the inner edge 48 of the window 26 constitutes a scraper and is disposed relatively close to the outer periphery of a roller 50. The roller 50 is mounted on a shaft 52 having its ends journaled on bracket arms 54 that are pivoted, as at 56, to the side walls 16 and 18.

Pins 58 secured to and projecting outwardly from the side walls 16 and 18 are disposed between and parallel to the shafts 32 and 52. Resilient members 60 form a connection between the ends of the shaft 52 and the pins 58 for yieldingly urging the roller 50 against the drum 34 so that the roller 50 will rotate with the drum 34 but in a direction opposite from the directional rotation of the drum 34.

The drum 34 is provided with a plurality of circumferentially spaced secantal slots 61 that slidably receive substantially rectangular trap plates 62. The ends of the plates 62 include cut-outs or notches 64 for a purpose now to be described.

The drum 34 is provided with an annular recess 66 at each end and a plurality of circumferentially spaced stop members 68 are pivotally secured, intermediate their ends, to the inner walls of the recesses 66 by fasteners 70. The leading ends 72 of the stop members 68 are received in the cut-outs 64 and by swinging the stop members 68 to a selected position and tightening the fasteners 70, the sliding movement of the plates 62 out of the slots 60 is limited by the stop members.

A casing 74 is secured to the rear wall 14 of the housing 10 and includes a concavo-convexed portion 76 that embraces the upper part of the roller 50. The forward edge 78 of the portion 76 constitutes a fly removing means for the drum 34 and is consequently disposed relatively close to the outer periphery of the drum 34. Supporting arms 80 are struck down from the portion 76 and are secured to the upper edges of the side walls 16 and 18 to retain the portion 76 properly disposed relative to the roller 50.

In practical use of the present invention, a suitable bait is applied to the outer periphery of the drum 34 and as the drum 34 rotates, in a clockwise direction, as shown in Figure 3, the plates 62 will gravitate downwardly and outwardly of the slots 60 to rest against the inner periphery of the window 26.

Flies trapped between the window 26 and the drum 34 by the plates 62 will be carried by the drum 34 to the roller 50, whereupon the flies will be crushed between the roller 50 and the drum 34.

Any flies remaining on the drum 34, after the crushing operation, will be removed therefrom by the edge 78 of the portion 76, but flies remaining on the roller 50 will fall into the drawer 22. Should any of the flies remain on the roller 50, the flies will be scraped from the roller 50 by the inner edge 48 of the window 26 to fall into the drawer 22.

Having now described my invention that which I claim as new and desire to procure by Letters Patent is:

1. A fly trap comprising a housing, a driven roller journaled in said housing for rotation, a portion of said driven roller projecting outwardly from said housing, an arcuate window of diaphanous material loosely embracing a portion of said driven roller, a second roller yieldingly bearing against said driven roller, means mounted on said housing for removing flies from said driven roller, and means for scraping the inner surface of said window.

2. The combination of claim 1, wherein said scraping means are carried by said driven roller.

3. The combination of claim 1, wherein said scraping means includes plates slidably carried by said driven roller.

4. A fly trap comprising a housing, a driven roller journaled in said housing for rotation, a portion of said driven roller projecting outwardly from said housing, an arcuate window of diaphanous material loosely embracing a portion of said driven roller, a second roller yieldingly bearing against said driven roller for rotation therewith, means for rotating said driven roller, means carried by the housing for removing flies from said driven roller, said driven roller having circumferentially spaced slots provided therein, scraper plates slidably received in said slots, and means carried by said driven roller limiting sliding movement of said plates outwardly of said slots and toward the inner surface of said window.

5. A fly trap comprising a housing, a driven roller journaled in said housing for rotation, a portion of said driven roller projecting outwardly from said housing, an arcuate window of diaphanous material loosely embracing a portion of said driven roller, a second roller yieldingly bearing against said driven roller for rotation therewith, means for rotating said driven roller, means carried by the housing for removing flies from said driven roller, said driven roller having circumferentially spaced secantal slots therein, scraper plates slidably mounted in said slots, and stop means carried by said driven roller for limiting sliding movement of said plates outwardly of said slots and toward the inner surface of the window, said plates being positioned entirely within said slots upon engaging said second roller.

6. The combination of claim 1, wherein said fly removing means includes an arcuate plate carried by said housing and having an edge disposed relatively close to the outer surface of said driven roller.

GUST WISEN.

REFERENCES CITED

The following references are of record in the file of this patent:

UNITED STATES PATENTS

| Number | Name | Date |
|---|---|---|
| 22,986 | Bigelow et al. | Feb. 15, 1859 |
| 1,277,298 | Dreilick | Aug. 27, 1918 |
| 1,379,948 | Wallace | May 31, 1921 |
| 1,505,886 | Haley | Aug. 19, 1924 |